US006219444B1

United States Patent
Shashua et al.

(10) Patent No.: US 6,219,444 B1
(45) Date of Patent: Apr. 17, 2001

(54) SYNTHESIZING VIRTUAL TWO DIMENSIONAL IMAGES OF THREE DIMENSIONAL SPACE FROM A COLLECTION OF REAL TWO DIMENSIONAL IMAGES

(75) Inventors: Amnon Shashua, Mevasseret Zion; Shai Avidan, Jerusalem, both of (IL)

(73) Assignee: Yissum Research Development Corporation of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/016,925

(22) Filed: Feb. 2, 1998

(30) Foreign Application Priority Data

Feb. 3, 1997 (IL) .......................................... 120136

(51) Int. Cl.[7] .................................................. G06K 9/00
(52) U.S. Cl. ............................ 382/154; 345/424; 348/42; 356/12
(58) Field of Search .................................... 382/100, 154, 382/282, 284, 286, 285, 103, 291, 294, 296, 302, 305, 307, 289; 345/121, 127, 131, 139, 437, 438, 424; 356/12; 348/42, 47, 49, 50, 51

(56) References Cited

U.S. PATENT DOCUMENTS

| 5,454,371 | * | 10/1995 | Fenster et al. ........................ 600/443 |
| 5,559,334 | * | 9/1996 | Gupta et al. ........................ 250/360.1 |
| 5,581,665 | * | 12/1996 | Sugiura et al. ...................... 700/251 |
| 5,598,515 | * | 1/1997 | Shashua .............................. 345/422 |
| 5,625,575 | * | 4/1997 | Goyal et al. ............................ 703/6 |
| 5,633,995 | * | 5/1997 | McClain .............................. 345/419 |
| 5,710,875 | * | 1/1998 | Harashima et al. .................. 345/419 |
| 5,805,135 | * | 9/1998 | Suzuoki et al. ...................... 345/139 |
| 5,821,943 | * | 10/1998 | Shashua .............................. 345/427 |
| 5,861,889 | * | 1/1999 | Wallace et al. ...................... 345/433 |

OTHER PUBLICATIONS

Rousso, B. et al. "Robust Recovery of Camera Rotation from Three Frames," Proceedings of the CPVR, CA, Institute of Computer Science, The Hebrew University of Jerusalem, (1996).

Laveau, S. et al., "3–D Scene Representation as a Collection of Images," Proceedings of the International Conference on Pattern Recognition IEEE , (1994), pp. 689–691.

Barrett, Eamon Dr., et al. "Robust Algebraic Invariant Methods With Applications in Geometry and Imaging," Proceedings of the SPIE on Remote Sensing, Lockheed Martin Missiles and Space Company, (Jul. 1995).

Benhama et al., "Force and torque computation from 2–D and 3–D finite element field solutions", IEEE–Proc.–Electric Power Appl. vol. 146, No. 1, Jan. 1999, pp. 25–31.*

Lucus, Bruce et al. "An Iterative Image Registration Technique with an Application to Stereo Vision," Proceedings IJCAI , Vancouver, Canada (1981) pp. 674–679.

Shashua, Amnon. "Algebraic Functions for Recognition," IEEE Transactions on Pattern Analysis and Machine Intelligence , vol. 17, No. 8, (Aug. 1995) pp. 779–789.

* cited by examiner

Primary Examiner—Jayanti K. Patel
(74) Attorney, Agent, or Firm—Richard A. Jordan (57) ABSTRACT

Method and apparatus are provided for generating two dimensional images representing scenes of three dimensional spaces as viewed for arbitrary observing point. In a specific embodiment of the method and apparatus, consecutive virtual images, computed from four dimensional reference images are consecutively displayed on a multimedia screen in order to convey motion of a body.

42 Claims, 3 Drawing Sheets

SYNTHESIZING VIRTUAL TWO DIMENSIONAL IMAGES OF THREE DIMENSIONAL SPACE FROM A COLLECTION OF REAL TWO DIMENSIONAL IMAGES

FIELD OF THE INVENTION

The invention is directed to a method of generating two dimensional virtual images representing a scene in three dimensional space as viewed from arbitrary observing points specific embodiment of the invention is directed to computing from two or more reference images of a scene, one or more virtual images of the scene which can be, for example, displayed consecutively on multimedia screen in order to convey motion of a camera relative to the scene.

BACKGROUND OF THE INVENTION

Computer applications of graphics and especially imaging necessitate heavy computing which is costly both in terms of hardware requirements and computing time.

Engineering applications of computer graphics such as photogrammetry aim to construct a "scene model" derived from reference images representing a geometrically precise model of the real world, which allows accurate synthesis of images of the real world from arbitrary points in space to be generated. In such procedures, measurements of geometric parameters relating to the scene and camera at time of acquiring the "model images" or "reference views or images" are used to extract the parameters for the model. An image, such as is seen on a video screen, is a two dimensional (2D) projection of a scene in the real (physical) three dimensional (3D) world.

All the mathematical entities describing the space and projections thereof, are derived from images and correspondences between images. Correspondences between images, that is, coordinates in the image planes of projections of the same point in a scene, are determined by finding (manually or by computerized methods) distinctive points in objects represented in one image and locating the points of the same objects as represented in the other images of the same scene. An illustrative method for finding correspondences between images is described in B. D. Lucas and T. Kanade. (An iterative image registration technique with an application to stereo vision. In *Proceedings IJCAI*, pages 674–679, Vancouver, Canada, 1981). FIG. 1A shows an image of a triangle having three apices, (m1,m2,m3), whereas FIG. 1B shows the same triangle viewed at different aspect with corresponded points m1', m2', m3'. Warping is used in computerized graphics for rendering images, based on deforming existing images by designating new positions to some or all of the picture elements (pixels) in 2D plane.

Alternative image synthesis methods, namely image based rendering methods, are currently subjects of development efforts, because of their advantages avoiding the cumbersome step of 3D model construction mentioned above. The present invention relates to that technological field. Typically, in the synthetic rendering approach, a transfer function is created, derived from a combination of correspondences between the model images and designated new image parameters, consequently by employment of warping function. Some methods can be used to generate interpolative images, i.e. inside the limit defined by the angle between the lines connecting the most extreme camera positions with the scene. S. Laveau and O. D. Faugeras, 3-D scene representation as a collection of images in *Proceedings of the International Conference on Pattern Recognition*, pages 689–691, Jerusalem, Israel, October 1994, describes a method, according to which two reference views, i.e. real images of the scene are used for computation and reprojection of a former, real image into a synthetic image that represents a view from a different aspect. This method suffers from some serious restrictions, for example it allows for extrapolated images to be reprojected, but limited in the viewing angle per projection. The basic concept of "fundamental matrix" is used by these authors to describe a specific 3×3 rank-2 matrix that describes the bi-linear relations between points in two reference views of a scene.

E. B. Barrett, P. M. Payton, and G. Gheen, Robust algebraic invariant methods with applications in geometry and imaging, in *Proceedings of the SPIE on Remote Sensing*, San Diego, Calif., July 1995, demonstrates that the mathematical concept of three linearity constraints improves the accuracy of image based rendering and facilitates extrapolation in the reprojection of images, according to their reasoning trilinear tensors provide best option for mathematical representation of scenes. As described in G. Temple, "Cartesian Tensors" (Methuen & Co, 1960), a tensor is a multi-linear function of direction.

A trilinear tensor as described in A. Shashua, Algebraic functions for recognition, *IEEE Transactions on Pattern Analysis and Machine Intelligence*, 17(8):779–789, 1995, (see also U.S. Pat. No. 5,821,943, issued Oct. 13, 1998, in the name of A. Shashua and entitled Apparatus And Method For Creating And Manipulating A 3D Object Based On A 2D Projection Thereof) can be used to represent the scene spaces so as to govern the 3D reprojections. The trilinear tensor is generated as follows. Let P be a point in 3D projective space projecting onto points p, p', p" in three views $\Psi$, $\Psi'$, $\Psi''$, respectively, each represented by two dimensional projective space. The relationship between the 3D and the 2D spaces is represented by the 3×4 matrices, $[I,0]$, $[A,\upsilon']$, and $[B,\upsilon'']$, such that $$p=[I,0]P$$

$$p'=[A,\upsilon']P$$

$$p''=[B,\upsilon'']P$$

where $P=[x,y,1,k]$, $p=(x,y,1)^T$, $p'=(x',y',1)^T$, and $p''=(x'',y'',1)^T$ (the superscript "T" designating a transposed matrix). The coordinates (x, y), (x',y'), (x'',y'') for points p, p' and p" are with respect to some arbitrary image origin, such as the geometric center of each image plane. It should be noted that the 3×3 matrices A and B are 2D projective transformations (homography matrices) from view $\Psi$ to view $\Psi'$ and view $\Psi''$, respectively, induced by some plane in space (the plane $\rho=0$). The vectors $\upsilon'$ and $\upsilon''$ are known as epipolar points, that is, the projection of 0, the center of projection of the first camera, onto views $\Psi'$ and $\Psi''$, respectively. The trilinear tensor is an array of 27 entries as follows $$a_i^{jk}=\upsilon'^j b_i^k - \upsilon''^k a_i^j, i,j,k=1,2,3 \qquad (1)$$

where superscripts denote contravariant indices (representing points in the 2D plane) and subscripts denote covariant indices (representing lines in the 2D plane, like the rows of A). Thus $a_i^j$ is the element of the j-th row and i-th column of A, and $\upsilon'^j$ is the j-th element of $\upsilon'$.

SUMMARY OF THE INVENTION

The present invention provides a method and apparatus for generation of virtual images based on reprojection of real images of a scene.

The present invention provides a method and apparatus of synthesizing a virtual image of a scene based on a plurality of "model" real images of the scene, without requiring construction of a three-dimensional (3D) model of the scene. Generally, as will be explained in greater detail below, according to the method, the model images of the scene are utilized to generate a tensor from which a chain of new tensors can be synthesized, each synthetic tensor representing a translation and/or rotation of a synthetic camera position relative to one of the real camera positions from which the real images were recorded that were used in generating the initial tensor. For the tensors in the chain, an equation can be used to synthesize each new tensor from a previous tensor in the chain, for example, either the preceding tensor in the chain, the initial tensor, or a tensor therebetween in the chain (if any). Each such tensor can be used to synthesize a new image by way of warping one of the real images. Each new synthetic, or virtual, image relates therefore to the new tensor and to a real image, keeping the same real image as a source for a sequence of images such as to convey movement.

In one embodiment, three images of the scene are used to create a rank-4 trilinear model tensor. Two of the model images are acquired at a narrow angle. For the two model images acquired at a narrow angle, the model images densely correspond, that is, most pixels in one image will represent projections of the same points in the scene. The third model image need not densely correspond to the other two, but it does need to have at least seven corresponding points with the other model images in order to define the tensor. This tensor, which will be referred to as "real tensor," is then used, together with the relevant positioning parameters of the new desired virtual image, to synthesize a new tensor. The new tensor is used to render a new, synthetic image by warping any of the model images. A still newer image can be synthesized by employing the newer rotation and translation parameters of the desired scene aspect in terms of rotation and translation to warp the same real image as before, by successively performing the action, a chain of synthetic images is formed.

Another embodiment makes use of a fundamental matrix, as used by Laveau et al. 1994. The fundamental matrix defines a correspondence between two images. In this embodiment, the fundamental matrix is used to form a trilinear tensor by regarding one of the two model images a second time, as an independent third model image. By so doing a third image is obtained and used to formulate the trilinear tensor, which is a legitimate rank-2 trilinear tensor. This tensor is then used as in the case of three independent images, together with the new geometric parameters (rotation and translation) relative to the earlier tensor to render a new, synthetic image. The elements of the tensor synthesized from two-views are those of the fundamental matrix between the two views. Then the rotation components between the two model views are recovered from the tensor. These components are incorporated together with the new virtual position parameters of a camera to synthesize a new tensor, using the tensor of two, rather than three, views as the initial tensor.

In either case, whether two or three images are used to form the trilinear tensor, once the trilinear tensor has been generated, it is used to generate new tensors and subsequently new views. The rendering itself, more specifically generating a visible image, is done by applying a warping algorithm to any of the model views or to a synthetic image derived according to the method.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 3 is an apparatus according to the present invention comprising hardware and software modules to process input 2D image data and output virtual imagery as follows:

Section A (above broken line) is an off-line section and section B (below broken line is an on line section of the apparatus.

DETAILED DESCRIPTION OF AN ILLUSTRATIVE EMBODIMENT

A system constructed in accordance with the invention can synthesize a virtual image of a scene based on a plurality of real "model" images of the scene, without requiring construction of a three-dimensional (3D) model of the scene. Generally, the model images of the scene are utilized in generating a trilinear tensor from which a chain of new tensors can be synthesized. For the tensors in the chain, an equation can be used to synthesize each new tensor from a previous tensor in the chain. Alternatively, all of the new tensors in the chain can be derived from the original tensor. In either case, each tensor in the chain can be used to synthesize a new image by warping one of the real images. Each new synthetic image relates therefore to the new tensor and to a real image, keeping the same real image as a source for a sequence of images such as to convey movement of a camera around the scene. If the new tensors are generated from the original tensor, each tensor in the chain is generated by applying rotational and translational parameters to the original tensor, the parameters representing a translation and rotation of a synthetic camera position relative to the camera position of one of the cameras from which one of the real images was recorded. On the other hand, if a new tensor is generated from a preceding tensor in the chain, the rotational and translational parameters represent a translation and rotation of the synthetic camera position relative to a camera position (real or synthetic) with which the preceding tensor is associated.

In one embodiment, three model images of the scene are used to create a rank-4 trilinear model tensor as described above in connection with equation (1). Two of the model images are acquired at a narrow angle, preferably up to 10° to 15°. It is possible to use wider angles, but generally the wider the angle, the less accurate will be the renderings of the synthetic images. However, this "narrow angle" limitation is not strict and future improvements in connection with generating the trilinear tensor may allow for wider angles. For the two model images acquired at a narrow angle, the model images densely correspond, that is, most pixels in one image will represent projections of the same points in the scene such that the shift in position at which the images are acquired is recorded. The third image needs to have at least seven corresponding points with the other model images in order to define the tensor. This tensor, which will be referred to as the "real tensor," is then used, together with the translational and rotational parameters to synthesize a new tensor as described above. The new tensor, in turn, is used to render a new, synthetic image by warping any of the model images. A still newer image can be synthesized by employing the newer parameters of the desired scene aspect in terms of rotation and translation to warp the same real image as before, by successively performing the action, a chain of synthetic images is formed.

Figure 1:
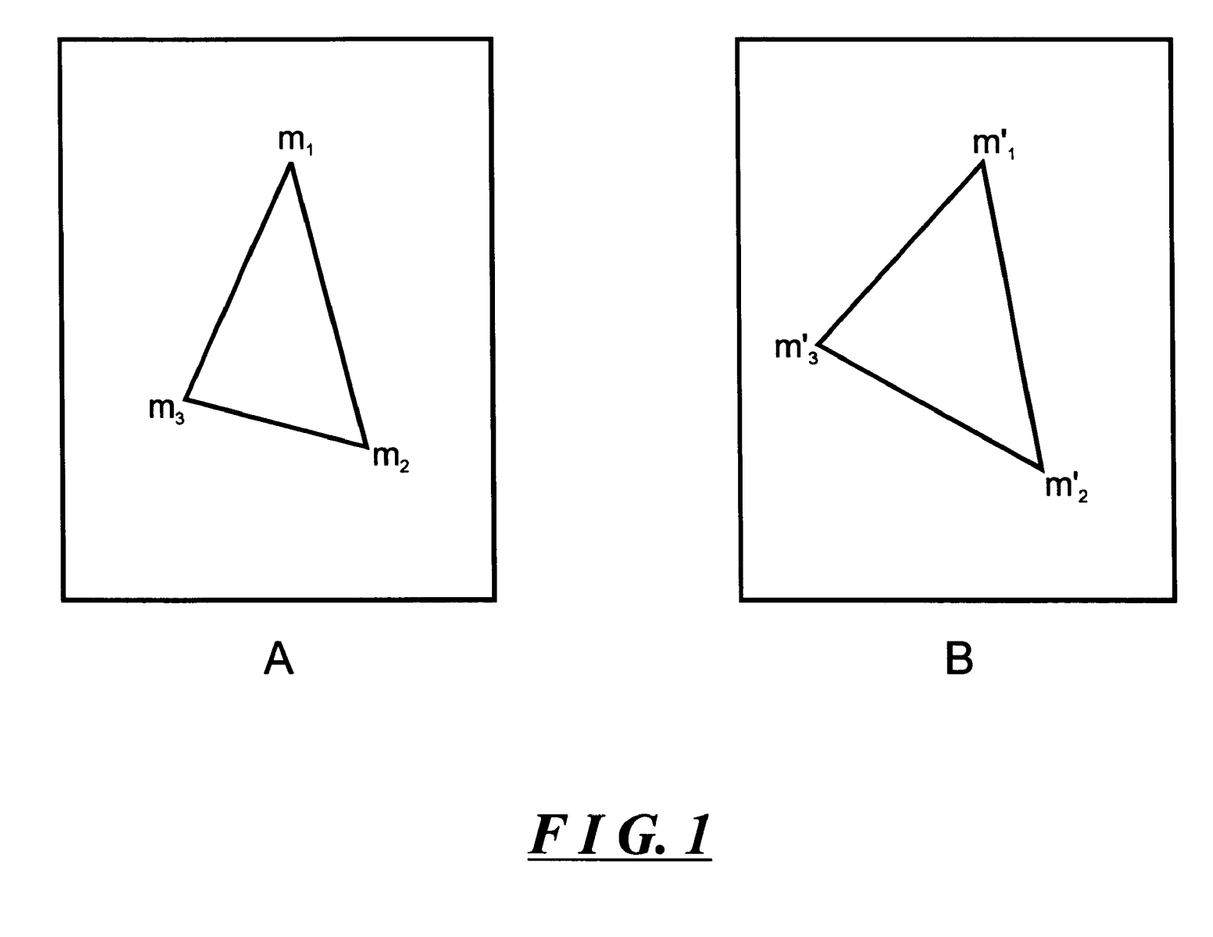
FIG. 1 correspondences between image points. Distinct points in 1A image are corresponded to points on 1B which is viewed from a different position.
Figure 2A:
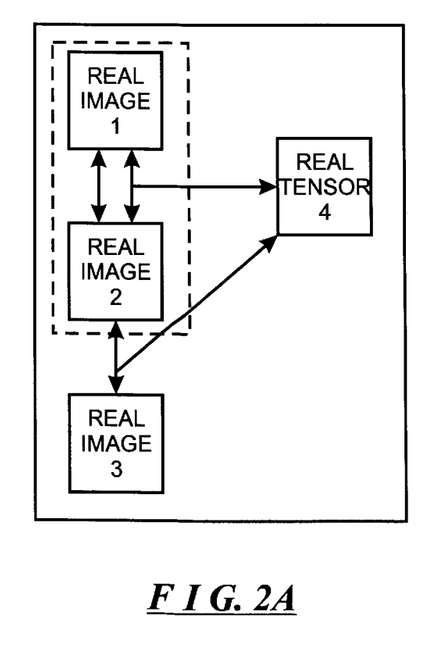
FIG. 2A is a schematic illustration of a sequence of operations on operands for creating a real tensor.

In that embodiment, two images of a scene are acquired by a digital camera, with the two lines of sight forming between them an angle of about 8°. A third image, is acquired from an arbitrary angle under the restriction that at least seven definite points can be matched with the former pair of images. As is shown in FIG. 1, the matching of points is a process in which same points which have different orientation in the different images of the scene are designated in the different images. Dense correspondence between the two closely oriented images 1 and 2, encircled by broken line in FIG. 2A, can be performed by a methodology such as that described in B. D. Lucas and T. Kanade, An iterative image registration technique with an application to stereo vision, *proceedings IJCAI*, pages 674–679, Vancouver, Canada (1981). That dense correspondence, and the correspondence with the third image are used to synthesize a real trilinear tensor 4 of the scene. The third image is used solely to derive the trilinear tensor 4 by corresponding at least seven pixels to the closely-oriented image pair, to generate an array of 27 entries in accordance with equation (1) above. While two of the model images are used to compute the dense correspondence, thus formulating 3D transformation, the third model view is used solely to compute the initial "real" tensor and is not used afterwards.

Figure 2B:
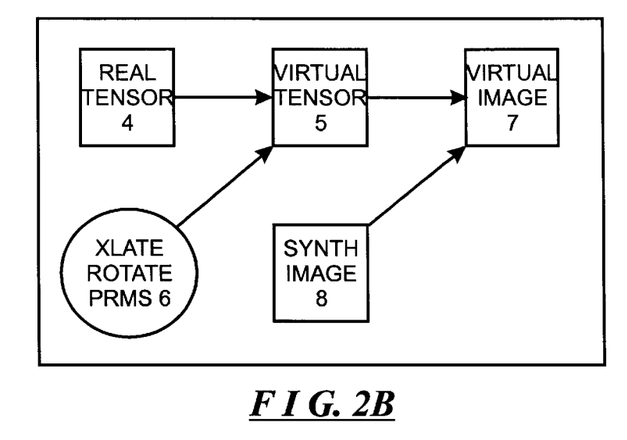
FIG. 2B is a schematic illustration of a sequence of operations on operands for creating a virtual tensor.
Figure 2C:
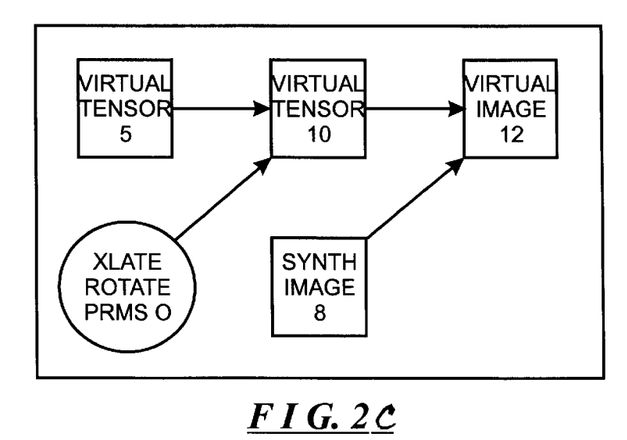
FIG. 2C is a schematic illustration of a sequence of operations on operands for creating a virtual tensor.

A new, user specified virtual image of the scene that can be obtained by a user by providing rotational and/or translational parameters defining a rotation and/or translation from the position of the camera at which the third real image 3 was recorded to the position of the camera at which the virtual image is to be deemed recorded. In one embodiment, the rotational and/or translational parameters may be provided by manipulating a computerized image orienting or pointing device such as a joystick or a mouse, with the user manipulation of the joystick or mouse defining translation and rotation parameters (FIG. 2B) 6, relative to the third real image. These parameters are applied to the real tensor 4 according to $$G_i^{jk} = R_l^k a_i^{jl} + t^k R_i^j \qquad (2)$$

in which, given the trilinear tensor $a_i^{jl}$ and the rotation R and translation t between the position of the camera position at which the third view was recorded and the virtual camera position at which the virtual image is to be synthesized, then a tensor $G_i^{jk}$ of views <1, 2, Ψ> can be generated, where "1" and "2" represent the two closely-oriented model images, Ψ represents the virtual camera position, and $G_i^{jk}$ represents the new virtual tensor 5 that is used in generating the virtual image 7. The best quality virtual image will be obtained by warping of a synthetic image 8 produced by averaging pixel by pixel the real images 1 and 2. In FIG. 2C it is shown how newer virtual positioning parameters 9 are incorporated into virtual tensor 5 to create a newer tensor 10, which will govern the warping parameters of synthetic image 8 to form the virtual image 12.

Another embodiment makes use of a fundamental matrix, as used by Laveau et al. 1994, from which the trilinear tensor is generated. The fundamental matrix defines a correspondence between two images. In this embodiment, the fundamental matrix is used to form a trilinear tensor by regarding one of the two model images a second time, as an independent third image. By so doing a third image is obtained and used to formulate the trilinear tensor, which is a legitimate rank-2 trilinear tensor. This tensor is then used as described above in the case of three independent images, together with the rotational and translational parameters to generate a new tensor for use in rendering a synthetic image. The elements of the tensor synthesized from two-views are those of the fundamental matrix between the two views. Synthesizing the tensor of two views from the fundamental matrix is straight forward. First the fundamental matrix is computed and then its elements are used to construct the tensor as follows:

$$a_i^{jk} = f_{(6-k-j)i}$$

if k=(j+1)mod 3

$$a_i^{jk} = -f_{(6-k-j)i}$$

if j=(k+1)mod 3

$$a_i^{jk} = 0$$

if j=k (i,j,k=1,2,3) where "j" means the element in the j-th row and the i-th column of the fundamental matrix F. The rotation components between the two model views are then recovered from the tensor according to the method described in B. Rousso, S. Avidan, A. Shashua, and S. Peleg, Robust recovery of camera rotation from three frames, *proceedings of the CVPR*, California (June 1996), modified according to the finding that two model views can substitute for three model views. These components are incorporated together with the new virtual position parameters of a camera to synthesize a new tensor, using the tensor of two, rather than three, views as the initial tensor.

Practical implementations of the virtual image generating system include those in the information and telecommunication business and industry. The development of information media and highways often bring about an increase in demand for fast image transmission and complementary information regarding real objects. The present invention provides a means for preparing conveniently computer-ready 3D imaging information that is economical in terms of computing costs or hardware required. Advertising, PR, any commercial, artistic and scientific representation of objects in space require according to the present invention a limited number of real images in dense correspondence accompanied by their trilinear tensor to be transferred. The receiving side is required to have the software to produce new tensors and reproject the information by warping the real images.

Figure 3:
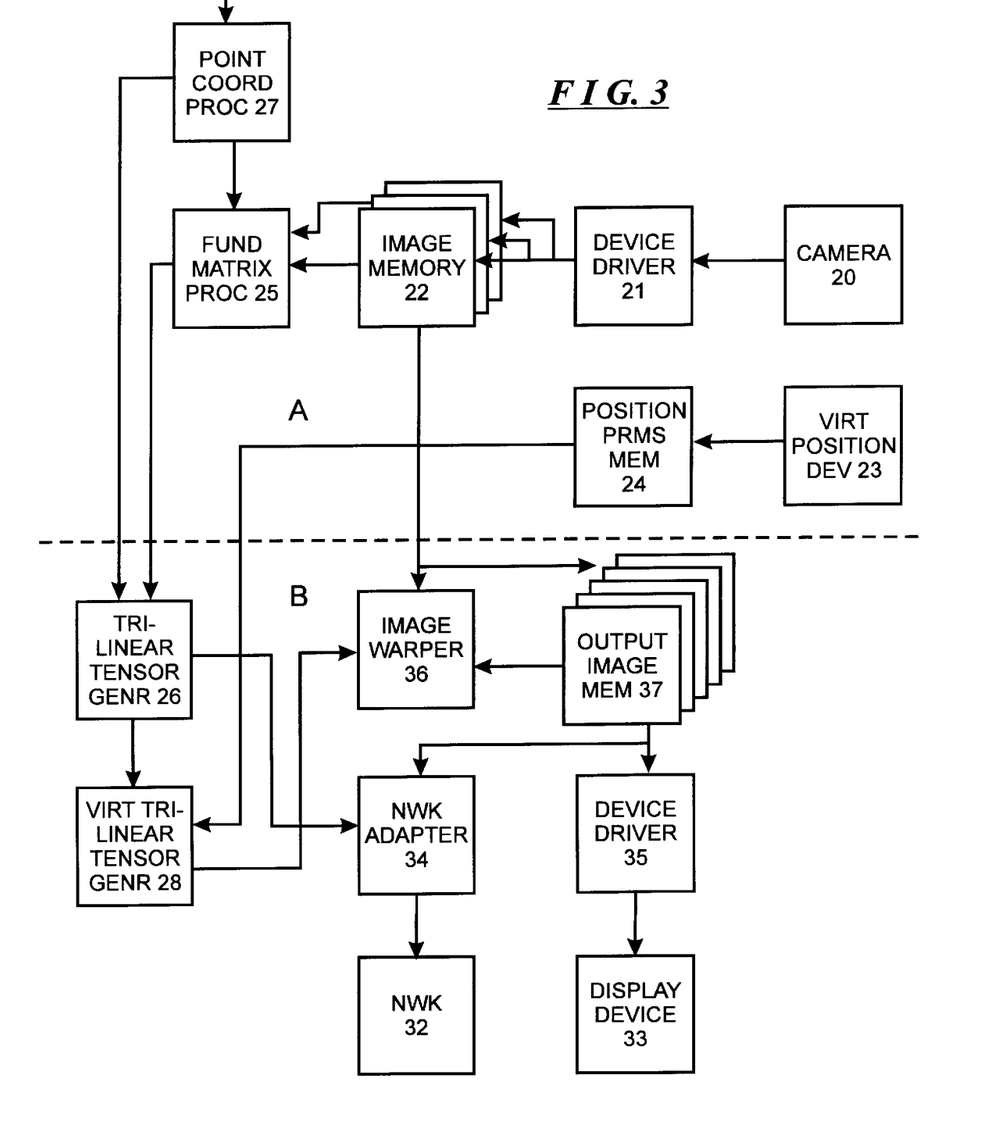

An apparatus according to the invention is schematically depicted in FIG. 3, comprising both hardware and software modules, as follows: 20 is a digital image capturing device such as a CCD camera or an office scanner, 21 is a device driver for 20, from which the images are transferred to a triple image memory 22. The fundamental matrix processor 25 accepts the first two images from image memory 22 and outputs a matrix to a trilinear tensor generator 26. Alternatively, trilinear matrix generator 26 can accept the dense correspondence of the first two images and also the correspondence data of the third image with the first image pair from a point coordinate processor 27. Output from trilinear tensor generator 26 is either to virtual trilinear tensor generator 28, which trilinear tensors, or to a network adapter 34. In order to produce tensors of random views, virtual trilinear tensor generator 28 receives data from a position parameters memory 24. A virtual positioning device 23 sends data to position parameters memory 24. An image warper 36 accepts data from image memory 22 and virtual trilinear tensor generator 28 and sends images to an output image memory 37. Images are provided either to a display device 33, through a suitable driver 35, such as a screen or printer, and also to a network 32, through network adapter 34, which also accepts data from 26. The network can also accept unwarped images directly, through a direct connection from image memory 22 to image memory 37.

The entire outlined apparatus resides (physically and logically) within a computer such as a PC, with most operations being performed by the host CPU, RAM and secondary memory. Specific hardware or general purpose software may attached to the computer and participate in operating the apparatus. Drivers, controllers and adapters such as joystick driver or Modem may be a part of the computer or attachments thereto.

The present invention has special benefits regarding 2D and 3D animation since the sequential nature of virtual tensor synthesis implicated is in accordance with the incremental change typical of motion pictures. Moreover the acceptance of positioning parameters automatically produced by commercial computerized pointing devices, make an embodiment according to this invention suitable for 3D interactive work.

Networks, especially client server configurations, are natural candidates for exploitation of the present invention by either transferring to the clients a set of reference images or a package consisting of reference images and matrices of correlations in an object file. An intermediate method would be to transfer images with a set of key matching points. Each possibility would infer a different amount of work to be performed by the client, and perhaps different software modules to be purchased according to mode of work.

The theoretical benefits of using a system and method of the invention over the method of Laveau et al. stem from the employment of tensor for the presentation of image geometry. In Laveau et al. the virtual images have to be designated by matching points on the reference images and by so indicating indirectly parameters of the new image. On the other hand, according to the present invention translational and rotational parameters of the virtual camera are incorporated into the formula producing the tensor which is used to define the new image directly. Another noticeable advantage of the present invention is its freedom from unsolvable singularity configurations of cameras such as the case known as three collinear camera configuration, which may well occur in prior art methods such as Laveau et al. It should also be said at this point that the method according to the invention takes care of degenerate cases of real or virtual camera position changes such as no translation.

The practical benefits of implementation of the invention are in two aspects: those relating to the improved performance as regards computerized rendering of 3D imagery and animation, and the other relating to simplification in driving the synthetic process, i.e. the lack of need to designate matching points in between the old and new images. Commercial implementation of such methodology is an outcome of the above unique features, namely reducing the cost of computer hardware requirements, such that would enable the rendering of synthetic images to take place at much lower costs (either with regards to equipment or processing time). Such benefits are of course a advantageous for employment of the technology in popular computerized environments, such as personal computer applications and typically for Internet transfer of 2D images of 3D scenes.

An existing technology of creating 3D picture prints out of at least two negatives using particular optical technology that provides a specific alignment of the negative images. This technology is being marketed today, but the system has several shortcomings, the major one in that there is needed for a special camera with multiple lens assembly in addition to a processing machine. The requirement for using a special camera can be avoided, namely by using a regular camera, and later aligning the images virtually by applying the technique according to the present invention. This technology is implemented by a newly-created division of Image Technology International Inc. named 3D Digital Design, Inc., located in Atlanta, Ga., U.S.A., which was created to exploit proprietary 3D technology for the computer imaging market.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A method of synthesizing a virtual image of a scene comprising the steps of:
   A. constructing a virtual trilinear tensor from a trilinear tensor associated with at least one real image and a positioning parameter defining a position of said virtual image relative to said at least one real image; and
   B. using the virtual trilinear tensor and said at least one real image to warp said at least one real image thereby to generate said virtual image.

2. A method as defined in claim 1 further comprising the step of generating said trilinear tensor from said at least one real image and two further real images of said scene.

3. A method as defined in claim 2 in which two of said real images are acquired at a narrow angle between lines of sight between said real images and said scene.

4. A method as defined in claim 1 in which said position parameter includes a translation parameter relating a translation of the virtual image relative to said one of said real images.

5. A method as defined in claim 1 in which said position parameter includes a rotation parameter relating a rotation angle of the virtual image relative to said one of said real images.

6. A method as defined in claim 5 in which the rotation angle is greater than an angle defining an imaginary cone defined by the lines of sight connecting between the three camera positions used to acquire the real images and the scene.

7. A method as defined in claim 1 in which said one of said real images is an image other than the two real images that are acquired at the narrow angle.

8. A method as defined in claim 1 in which said one of said real images is has at least seven points that correspond to points in said two real images that are acquired at the narrow angle.

9. A method as defined in claim 1, further comprising the steps of:
   A. constructing a second virtual trilinear tensor from the trilinear tensor and a positioning parameter defining a position of a second virtual image relative to one of said real images; and
   B. using the second virtual trilinear tensor and one of said real images to warp a real image thereby to generate a second virtual image.

10. A method as defined in claim 1, further comprising the steps of:
   A. constructing a second virtual trilinear tensor from the virtual trilinear tensor and a positioning parameter defining a position of a second virtual image relative to said virtual image; and
   C. using the second virtual trilinear tensor and said virtual image to warp a real image thereby to generate a second virtual image.

11. A method as defined in claim 1 further comprising the steps of:
   A. constructing a fundamental matrix from the at least one real image and a second real image; and
   B. constructing said trilinear tensor from the fundamental matrix.

12. A method as defined in claim 11 in which said real images are acquired at a narrow angle between lines of sight connecting the respective real images with the scene.

13. A method as defined in claim 11 in which said fundamental matrix construction step includes the step of constructing the fundamental matrix using coordinates of corresponding points in the two real images.

14. A method as defined in claim 1 further comprising the step of transferring said trilinear tensor and said at least one real image to a user over a network.

15. A system for synthesizing a virtual image of a scene comprising:
   A. a virtual trilinear tensor generator configured to construct a virtual trilinear tensor from a trilinear tensor associated with at least one real image and a positioning parameter defining a position of said virtual image relative said at least one real image; and
   B. a virtual image generator configured to use the virtual trilinear tensor and said at least one real image to warp said at least one real image thereby to generate said virtual image.

16. A system as defined in claim 15 in which the virtual trilinear tensor generator is configured to generate said trilinear tensor from said at least one real image and two further real images of said scene.

17. A system as defined in claim 16 in which two of said real images are acquired at a narrow angle between lines of sight between said real images and said scene.

18. A system as defined in claim 15 in which said position parameter includes a translation parameter relating a translation of the virtual image relative to said one of said real images.

19. A system as defined in claim 15 in which said position parameter includes a rotation parameter relating a rotation angle of the virtual image relative to said one of said real images.

20. A system as defined in claim 19 in which the rotation angle is greater than an angle defining an imaginary cone defined by the lines of sight connecting between the three camera positions used to acquire the real images and the scene.

21. A system as defined in claim 15 in which said one of said real images is an image other than the two real images that are acquired at the narrow angle.

22. A system as defined in claim 15 in which said one of said real images is has at least seven points that correspond to points in said two real images that are acquired at the narrow angle.

23. A system as defined in claim 15, in which said virtual trilinear generator is further configured to construct a second virtual trilinear tensor from the trilinear tensor and a positioning parameter defining a position of a second virtual image relative to one of said real images, the virtual image generator being further configured to use the second virtual trilinear tensor and one of said real images to warp a real image thereby to generate a second virtual image.

24. A system as defined in claim 15, in which said virtual trilinear generator is further configured to constrict a second virtual trilinear tensor from the virtual trilinear tensor and a positioning parameter defining a position of a second virtual image relative to one of said real images, the virtual image generator being further configured to use the second virtual trilinear tensor and one of said real images to warp a real image thereby to generate a second virtual image.

25. A system as defined in claim 15 further comprising:
   A. a fundamental matrix generator configured to construct a fundamental matrix from the at least one real image and a second real image; and
   B. a trilinear tensor generator module configured to construct said trilinear tensor from the fundamental matrix.

26. A system as defined in claim 25 in which said real images are acquired at a narrow angle between lines of sight connecting the respective real images with the scene.

27. A system as defined in claim 25 in which said fundamental matrix generator is further configured to construct the fundamental matrix using coordinates of corresponding points in the two real images.

28. A system as defined in claim 15 further comprising a module configured to transfer said trilinear tensor and said at least one real image to a user over a network.

29. A computer program product for use in connection with a computer to synthesize a virtual image of a scene, the computer program product comprising a machine readable medium having encoded thereon:
   A. a virtual trilinear tensor generator module configured to enable the computer to construct a virtual trilinear tensor from a trilinear tensor associated with at least one real image and a positioning parameter defining a position of said virtual image relative said at least one real image; and
   B. a virtual image generator module configured to enable the computer to use the virtual trilinear tensor and said at least one real image to warp said at least one real image thereby to generate said virtual image.

30. A computer program product as defined in claim 29 in which the virtual trilinear tensor generator module is configured to enable the computer to generate said trilinear tensor from said at least one real image and two further real images of said scene.

31. A computer program product as defined in claim 30 in which two of said real images are acquired at a narrow angle between lines of sight between said real images and said scene.

32. A computer program product as defined in claim 29 in which said position parameter includes a translation parameter relating a translation of the virtual image relative to said one of said real images.

33. A computer program product as defined in claim 29 in which said position parameter includes a rotation parameter relating a rotation angle of the virtual image relative to said one of said real images.

34. A computer program product as defined in claim 33 in which the rotation angle is greater than an angle defining an imaginary cone defined by the lines of sight connecting between the three camera positions used to acquire the real images and the scene.

35. A computer program product as defined in claim 29 in which said one of said real images is an image other than the two real images that are acquired at the narrow angle.

36. A computer program product as defined in claim 29 in which said one of said real images is has at least seven points that correspond to points in said two real images that are acquired at the narrow angle.

37. A computer program product as defined in claim 29, in which said virtual trilinear generator module is further configured to enable the computer to construct a second virtual trilinear tensor from the trilinear tensor and a positioning parameter defining a position of a second virtual image relative to one of said real images, the virtual image generator module being further configured to enable the computer to use the second virtual trilinear tensor and one of said real images to warp a real image thereby to generate a second virtual image.

38. A computer program product as defined in claim 29, in which said virtual trilinear generator module is further configured to enable the computer to construct a second virtual trilinear tensor from the virtual trilinear tensor and a positioning parameter defining a position of a second virtual image relative to one of said real images, the virtual image generator module being further configured to enable the computer to use the second virtual trilinear tensor and one of said real images to warp a real image thereby to generate a second virtual image.

39. A computer program product as defined in claim 29 further comprising:
   A. a fundamental matrix generator module configured to enable the computer to construct a fundamental matrix from the at least one real image and a second real image; and
   B. a trilinear tensor generator module configured to enable the computer to construct said trilinear tensor from the fundamental matrix.

40. A computer program product as defined in claim 39 in which said real images are acquired at a narrow angle between lines of sight connecting the respective real images with the scene.

41. A computer program product as defined in claim 39 in which said fundamental matrix generator module is further configured to enable the computer to construct the fundamental matrix using coordinates of corresponding points in the two real images.

42. A computer program product as defined in claim 29 further comprising a module configured to enable the computer to transfer said trilinear tensor and said at least one real image to a user over a network.

* * * * *

UNITED STATES PATENT AND TRADEMARK OFFICE
CERTIFICATE OF CORRECTION

PATENT NO. : 6,219,444 B1  
DATED : April 17, 2001  
INVENTOR(S) : Amnon Shashua et al.

It is certified that error appears in the above-identified patent and that said Letters Patent is hereby corrected as shown below:

Title page,
Item [73], Assignee, change "Corporation" to -- Company --.

Signed and Sealed this

Twenty-second Day of November, 2005

JON W. DUDAS
*Director of the United States Patent and Trademark Office*